United States Patent
Graf et al.

(10) Patent No.: US 6,870,614 B2
(45) Date of Patent: Mar. 22, 2005

(54) METHOD, SYSTEM AND COMPUTER PRODUCT FOR FORMULATING A BI-DIRECTIONAL COLOR MATCH

(75) Inventors: John Frederick Graf, Ballston Lake, NY (US); Hongyi Zhou, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 293 days.

(21) Appl. No.: 10/063,960

(22) Filed: May 30, 2002

(65) Prior Publication Data

US 2003/0223060 A1 Dec. 4, 2003

(51) Int. Cl.[7] .................................................. G01J 3/42
(52) U.S. Cl. ...................................... 356/319; 356/402
(58) Field of Search ................................ 356/319, 402, 356/405

(56) References Cited

U.S. PATENT DOCUMENTS

| | | | |
|---|---|---|---|
| 5,231,472 A | * | 7/1993 | Marcus et al. ............... 356/402 |
| 5,668,633 A | | 9/1997 | Cheetham et al. |
| 5,720,017 A | | 2/1998 | Cheetham et al. |
| 5,740,078 A | | 4/1998 | Cheetham et al. |
| 5,841,421 A | | 11/1998 | Cheetham et al. |
| 5,929,998 A | | 7/1999 | Kettler et al. |
| 6,064,487 A | * | 5/2000 | Kettler et al. ............... 356/402 |
| 6,166,814 A | | 12/2000 | Pringle |
| 6,177,093 B1 | | 1/2001 | Lombardi et al. |
| 6,249,751 B1 | * | 6/2001 | Asaba et al. ................ 356/326 |
| 6,362,885 B1 | * | 3/2002 | Osumi et al. ............... 356/408 |
| 6,539,325 B1 | * | 3/2003 | Numata et al. ............. 356/402 |
| 6,714,924 B1 | * | 3/2004 | McClanahan ................ 706/15 |

OTHER PUBLICATIONS

FW Billmeyer, Jr., et al. "Color and Appearance of Metallized Paint Films", II. Initial Application of Turbid–Medium Theory, Journal of Coatings Technology, vol 48, No. 613, Feb. 1976, pp 53–60.

Datacolor—Pearl Color Control Software. Retrieved on May 3, 2002. Retrieved from the Internet: <URL: http://www.datacolor.com>.

* cited by examiner

*Primary Examiner*—F. L. Evans
*Assistant Examiner*—Kara Geisel
(74) *Attorney, Agent, or Firm*—Andrew J. Caruso; Patrick K. Patnode

(57) ABSTRACT

Method, system and computer product for formulating a bi-directional color match. In this disclosure, a computing unit obtains spectral measurements of a target bi-directional color. The computing unit uses a bi-directional color formulation tool determine a combination of pigments, dyes and platelet-shaped pigments that generates spectral measurements that match the spectral measurements of the target bi-directional color.

71 Claims, 5 Drawing Sheets

METHOD, SYSTEM AND COMPUTER PRODUCT FOR FORMULATING A BI-DIRECTIONAL COLOR MATCH

BACKGROUND OF INVENTION

This disclosure relates generally to color formulation and more particularly to generating a color formula for matching a bi-directional color.

Bi-directional colors, unlike typical diffuse colors, appear to change color as the angle of illumination and observation changes. Examples of bi-directional colors include metallic colors, pearlescent colors, and interference colors. Bi-directional colors have been used for decades in small volumes by the paint and cosmetic industry. More recently, bi-directional colors are beginning to spread to new mainstream applications in the plastic, paint, textile, ink, and cosmetic industries.

To achieve a bi-directional color, usually a flake, disk or platelet-shaped pigment ingredient is used in the material's formula. These platelet-shaped pigments typically have particle diameters that are sufficiently large (10 to 100 microns) with a relatively smooth surface, yet are relatively thin (0.1 to 1 microns). Light that hits one of these platelet-shaped pigment particles, can either undergo specular mirror like reflection as in the case of metallic flake pigments or can be partially transmitted and undergo interference as in the case of interference or pearlescent pigments. For both of these cases, the platelet-shaped pigment particles do not scatter the light in a diffuse way like typical spherical, cubical, or low aspect ratio irregularly shaped pigment particles. Because the platelet-shaped particle does not scatter the light in a diffuse manner, it maintains its bi-directional nature. Another property of the platelet-shaped pigment particle is its ability to align with flow during mixing and processing due to its high aspect ratio. This partial or full alignment can significantly change the angle dependence of the physical color.

When color matching bi-directional colors, the industry has had to rely on trial and error methods and artistic expertise because of the lack of computational methods and measurement tools. Typically, a color technician is given a physical sample of the target bi-directional color to match. They measure the target color using a spectrophotometer to get a color measurement. With this measurement, the technician uses standard diffuse color matching tools and methods, such as described in U.S. Pat. No. 5,668,633, entitled Method and System for Formulating a Color Match, to get a diffuse color formula. This diffuse color formula is composed of pigments and dyes of various concentrations that when mixed and compounded together in a material generate a physical color that is diffuse. The technician would then use this diffuse color formula as a starting point and begin a trial-and-error process. First the technician would produce a trial batch using the starting point formula and evaluate how well it matched the physical target color under all angles of observation and illumination. To improve the match under the various angles, the technician would use their own expertise to decide what concentrations of platelet-shaped pigment particles to add in order to better match the bi-directional color. They would then produce another trial batch and once again evaluate how well it matched the physical target color under all angles of observation and illumination. This iterative process would proceed until either a match was achieved or the technician gave up. The industry calls this process "matching the color flop."

The problem with this trial-and-error approach is that it is very slow and relies on the presence of a very experienced color technician who can evaluate a color under multiple angles and decide on how best to modify the color formula. Because the number of application of bi-directional colors is increasing, there is now the need for an efficient systematic computational approach that can generate a color formula composed of pigments and dyes that matches a bi-directional color under all angles of observation and illumination.

SUMMARY OF INVENTION

In one embodiment of this disclosure, there is a method and computer readable medium that stores instructions for instructing a computer system, to formulate a bi-directional color match. This embodiment comprises obtaining a plurality of spectral measurements of a target bi-directional color and determining a combination of pigments, dyes and platelet-shaped pigments having a plurality of predicted spectral measurements that match the plurality of spectral measurements of the target bi-directional color.

In a second embodiment of this disclosure, there is a method and computer readable medium that stores instructions for instructing a computer system, to formulate a bi-directional color match from a set of previously used bi-directional color formulations. This embodiment comprises obtaining a plurality of spectral measurements of a target bi-directional color; searching the set of previously used directional color formulations for color formulas that approximates the target bi-directional color; determining from the color formulas a formula that best matches the target bi-directional color; and adapting the concentrations of the pigments, dyes and platelet-shaped pigments.

In another embodiment, there is a method and computer readable medium that stores instructions for instructing a computer system to formulate a bi-directional color match from a set of previously used bi-directional color formulations. This embodiment comprises obtaining a plurality of spectral measurements of a target bi-directional color; receiving matching requirements for obtaining color formulas that approximates the target bi-directional color; searching the set of previously used bi-directional color formulations according to the matching requirements; determining from the set of color formulas a color formula that best matches the target bi-directional color according to the matching requirements; adapting the concentrations of the pigments, dyes and platelet-shaped pigments in the color formula; and determining if the adapted color formula matches the target bi-directional color.

In a fourth embodiment, there is a method and computer readable medium that stores instructions for instructing a computer system, to formulate a bi-directional color match from a set of previously used bi-directional color formulations. This embodiment comprises obtaining a plurality of spectral measurements of a target bi-directional color; entering matching requirements for obtaining color formulas that approximates the target bi-directional color; searching the set of previously used bi-directional color formulations according to the matching requirements; determining from the set of color formulas a color formula that best matches the target bi-directional color according to the matching requirements; adapting the concentrations of the pigments, dyes and platelet-shaped pigments in the color formula to improve the match with the target bi-directional color if the formula is unacceptable; determining if the adapted color formula matches the target bi-directional color; and modifying the adapted color formula if the formula is unacceptable, the modifying comprising at least one of manual adjusting the concentrations of the pigments, dyes and platelet-shaped pigments in the color formula, synthesizing a match with the target bi-directional color, or searching through the set of previously used bi-directional color formulations until there is an acceptable match.

In still another embodiment, there is a system for formulating a bi-directional color match. In this embodiment, a spectrophotometer obtains a plurality of spectral measurements of a target bi-directional color. A computing unit determines a combination of pigments, dyes and platelet-shaped pigments having a plurality of predicted spectral measurements that match the plurality of spectral measurements of the target bi-directional color.

In a sixth embodiment, there is a formulating a bi-directional color match from a set of previously used bi-directional color formulations. In this embodiment, there is a spectrophotometer that obtains a plurality of spectral measurements of a target bi-directional color. A color database contains a plurality of previously used bi-directional color formulations and a plurality of optical parameters associated with each of the pigments, dyes and platelet-shaped pigments used in the bi-directional color formulations. A computing unit, coupled to the spectrophotometer and color database, searches the color database for a set of color formulas that approximates the target bi-directional color and determines from the set of color formulas a color formula that best matches the target bi-directional color measured by the spectrophotometer.

In still another embodiment, there is a bi-directional color formulation tool. In this embodiment, there is a data acquisition component that obtains a plurality of spectral measurement of a target bi-directional color from a spectrophotometer. A data extraction component extracts a set of previously used color formulations that approximates the target bi-directional color data from a color database and determines a formula from the set that best matches the target bi-directional color. A bi-directional color matching component determines the concentrations of the pigments, dyes and platelet-shaped pigments in the formula to generate a predicted visible spectra that matches the target bi-directional color spectra.

DETAILED DESCRIPTION

Figure 1:
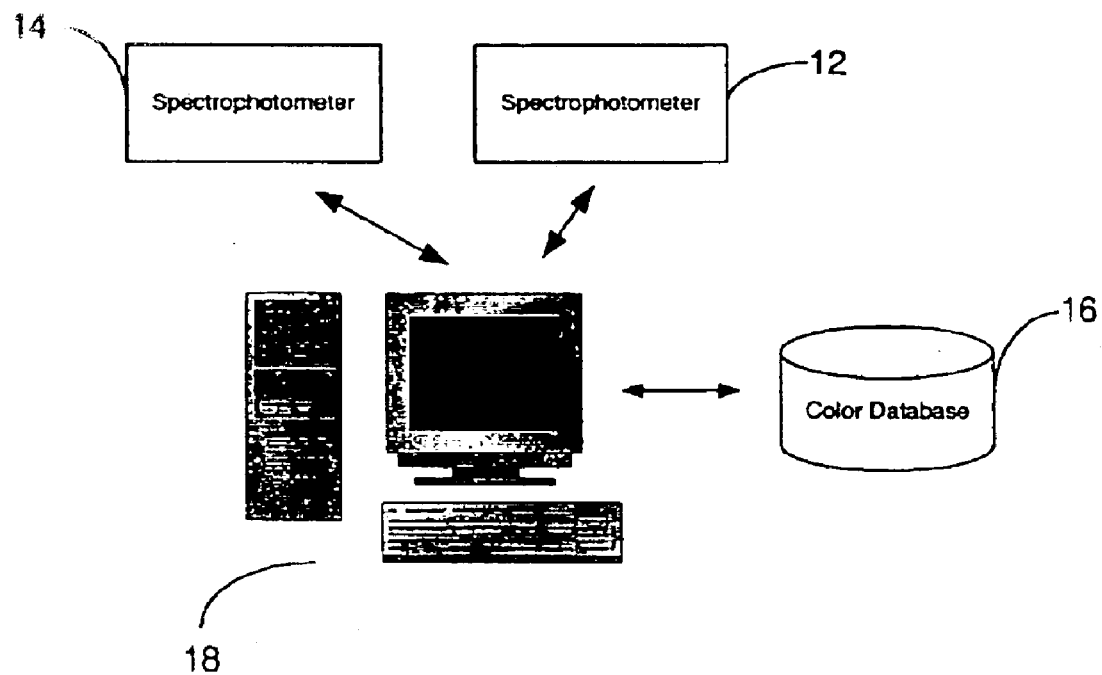
FIG. 1 shows a schematic diagram of a system used to determine a color formula for a target bi-directional color.

FIG. 1 shows a schematic diagram of a system 10 used to determine a color formula for a target bi-directional color. In this disclosure, a target bi-directional color is the physical color of a bi-directional color that one desires to match. A bi-directional color comprises a combination of pigments, dyes and platelet-shaped pigments embedded in a material such as plastic, paint, ink, textile and cosmetic medium, that exhibit various colors depending on the angles of observation and illumination. One of ordinary skill in the art will recognize that this definition of a bi-directional color may include metallic colors, sparkle colors, pearlescent colors, and interference colors that exhibit various colors depending on the angles of observation and illumination.

Referring again to FIG. 1, the system 10 comprises a spectrophotometer 12 that measures the color of the target bi-directional color. The spectrophotometer 12 is a multi-angle spectrophotometer such as a goniospectrophotometer that measures the spectral transmittance, spectral reflectance or relative spectral emittance of the target bi-directional color with a variety of observation and illumination angles (e.g., four) using bi-directional geometry. The goniospectrophotometer may be a GretagMacbeth CE-740 goniospectrophotometer, however, other commercially available goniospectrophotometers are suitable. The system 10 also comprises another spectrophotometer 14 that measures the color of the target bi-directional color. The spectrophotometer 14 is an integrating sphere spectrophotometer that can either collect light reflected or transmitted from a specimen into a hemisphere or to provide isotropic irradiation of a specimen from a complete hemisphere, consisting of an approximately spherical cavity with apertures (ports) for admitting and detecting light. The integrating sphere spectrophotometer may be a GretagMacbeth CE-7000 spectrophotometer, however, other commercially available integrating sphere spectrophotometers are suitable. Although the system 10 shows the combination of a goniospectrophotometer and an integrating sphere spectrophotometer, one of ordinary in the art will recognize that the goniospectrophotometer can be used without the integrating sphere spectrophotometer to provide a plurality of spectral measurements of the target bi-directional color.

The system 10 in FIG. 1 also shows a color database 16 containing a variety of color information. Some of the information stored in the color database 16 comprises a plurality of previously used bi-directional color formulations and their respective spectrophotometer measurements, wherein each formulation contains the pigments, dyes and platelet-shaped pigments used in the formula along with their respective concentrations. In addition, each color formulation comprises a plurality of optical parameters associated with each of the pigments, dyes and platelet-shaped pigments used in the bi-directional color formula. The plurality of optical parameters for the platelet-shaped pigments comprise items such as the pigment's complex refractive index by wavelength, the type or shape of platelet-shaped pigments used in the formula, the particle dimensions and thicknesses, the size distributions of the platelet-shaped pigments in the formula, the composition of the platelet-shaped pigments in the formula (e.g., aluminum, metal oxides, TiO2 coated mica), the orientation distribution function of the platelet-shaped pigments, the adsorption and scattering coefficients by wavelength for the platelet-shaped pigments, and the scattering re-distribution function for the platelet-shaped pigments. The optical parameters for the pigment and dye colorants include items such as the complex refractive index by wavelength for the pigments and dyes, the particle diameter and size distribution of the pigments in the formula, the adsorption and scattering coefficients by wavelength for the pigments and dyes, and the scattering phase function for the pigments. One of ordinary skill in the art will recognize that the color database 16 may include other color data such as tristimulus color coefficients, scattering phase functions, and concentrations for pigment concentrates, mixtures, or composites.

A computing unit 18, coupled to the spectrophotometers 12 and 14 and color database 16, searches the color database for a set of color formulas that approximates the target bi-directional color and determines from the set of color formulas a color formula that best matches the target bi-directional color measured by the spectrophotometers under a multiple of angles. For the formula deemed to have the best match with the target bi-directional color, the computing unit 18 retrieves the optical parameters for the pigments, dyes and platelet-shaped pigments used in the formula and inputs them into a single particle scattering algorithm.

The purpose of the single particle scattering algorithm is used to calculate the adsorption and scattering coefficient, and the scattering re-distribution function by wavelength for each pigment, dye and platelet-shaped pigment. The single particle scattering algorithm in this disclosure uses Mie theory equations for particles less than 10 microns and a Monte Carlo method based on geometric optics ray-tracing for particles larger than 10 microns in size. For multi-layer or coated pigment particles, equations for the reflection and transmission by a multi-layer thin film are used to account for the constructive and destructive interference nature of light. Once the single particle scattering algorithm calculates the adsorption and scattering coefficient, and the scattering re-distribution function by wavelength for each pigment, dye and platelet-shaped pigment, it will then use the concentrations of the pigments, dyes and platelet-shaped pigments in the bi-directional color formula to calculate an average adsorption and scattering coefficient, and the scattering re-distribution function by wavelength for the bi-directional color formula.

The computing unit 18 then takes the output from the single particle scattering algorithm for the bi-directional color formula and inputs it into a multiple scattering algorithm. The multiple scattering algorithm uses an Adding and Doubling matrix method to handle the zenith angle dependence of multiple scattering and a Fourier series expansion technique to handle the azmuthal angle dependence of the light scattering.

The computing unit 18 then utilizes a non-linear squares fitting method to determine the concentrations of the pigments, dyes, platelet-shaped pigments that will generate a predicted visible spectra that matches the measured spectra of the target bi-directional color. Below is a more detailed discussion of the single particle scattering algorithm, multiple scattering algorithm and non-linear squares fitting method.

Figure 2:
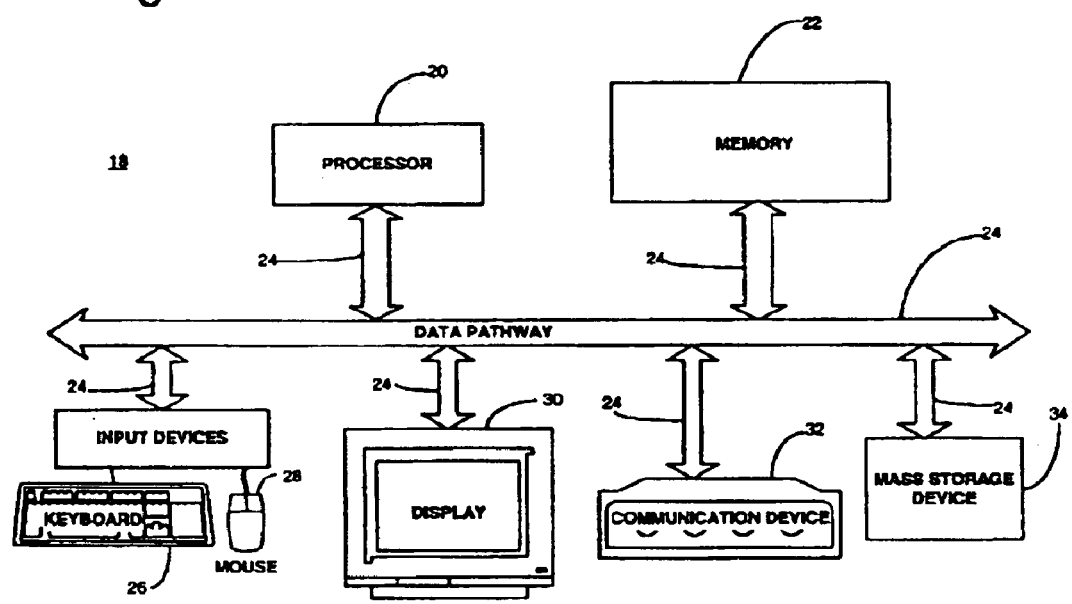
FIG. 2 shows a more detailed diagram of a general-purpose computer system that operates in the system shown in FIG. 1.

FIG. 2 shows a more detailed diagram of the computing unit 18 shown in FIG. 1. The computer unit 18 generally comprises a processor 20, memory 22, input/output devices, and data pathways (e.g., buses) 24 connecting the processor, memory and input/output devices. The processor 20 accepts instructions and data from memory 22 and performs various calculations. The processor 20 includes an arithmetic logic unit (ALU) that performs arithmetic and logical operations and a control unit that extracts instructions from memory 22 and decodes and executes them, calling on the ALU when necessary. The memory 22 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 22 preferably contains an operating system, which executes on the processor 20. The operating system performs basic tasks that include recognizing input, sending output to output devices, keeping track of files and directories and controlling various peripheral devices.

The input/output devices may comprise a keyboard 26 and a mouse 28 that enter data and instructions into the computing unit 18. Also, a display 30 may be used to allow a user to see what the computing unit has accomplished. Other output devices may include a printer, plotter, synthesizer and speakers. A communication device 32 such as a telephone or cable modem or a network card such as an Ethernet adapter, local area network (LAN) adapter, integrated services digital network (ISDN) adapter, Digital Subscriber Line (DSL) adapter or wireless access card, enables the computing unit 18 to access other computers and resources on a network such as a LAN, wireless LAN or wide area network (WAN). A mass storage device 34 may be used to allow the computing unit 18 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computing unit 18 can take the form of a handheld digital computer, personal digital assistant computer, notebook computer, personal computer, workstation, mini-computer, mainframe computer or super-computer.

Figure 3:
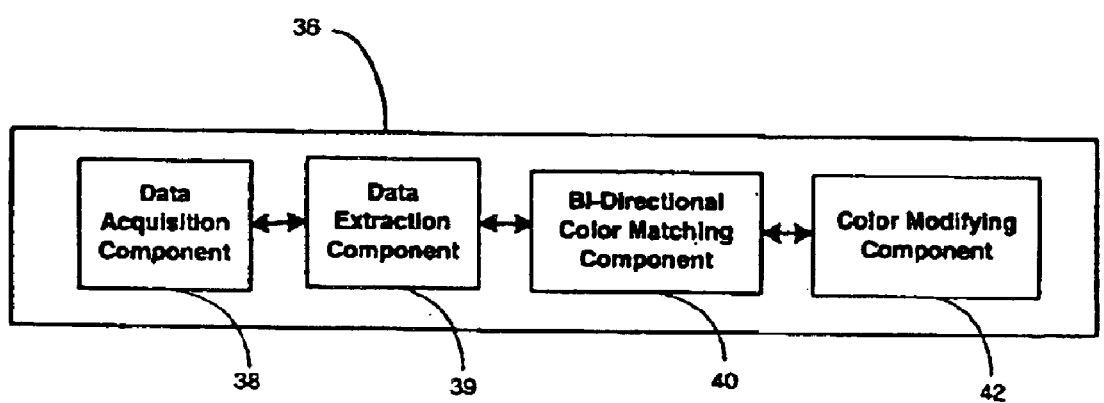
FIG. 3 shows a top-level component architecture diagram of a bi-directional color formulation tool that operates on the computer system shown in FIG. 2.

FIG. 3 shows a top-level component architecture diagram of a bi-directional color formulation tool 36 that operates on the computer system 18 shown in FIG. 2. The bi-directional color formulation tool 36 comprises a data acquisition component 38 that acquires the spectral measurements from the spectrophotometers 12 and 14, which are generally coupled to the computing unit through ports. In this disclosure, the data acquisition component 38 acquires the measurements by putting the physical sample of the bi-directional color target into the sample holder of the spectrophotometer, and having the computer request the spectrophotometer to take measurements at a predefined number of angles of observation and illumination. The spectrophotometer will then send over the resulting plurality of spectral measurements usually through the serial port to the computing unit. In addition to acquiring the measurements, the data acquisition component 38 performs data preprocessing functions such as averaging measurements taken at different locations of the bi-directional color target and calculating the tristimulus color for each spectral measurement.

The bi-directional color formulation tool 36 also comprises a data extraction component 39 that extracts the color data from the color database 16. The data extraction component 39 receives color measurements of the target bi-directional color from the data acquisition component 38 and matching requirements entered by a user of the tool 36 and extracts a plurality of formula keys corresponding to the color spectrum of the target bi-directional color. Each of the plurality of formula keys has a different combination of pigments, dyes, platelet-shaped pigments that formulate the target bi-directional color. The plurality of formula keys are restricted to combinations that have a greater probability of generating a color match with the target bi-directional color. The data extraction component 39 evaluates each of the plurality of formula keys in order of their probability of generating a color match with the target bi-directional color to determine whether the pigments, dyes, platelet-shaped pigments in each formula key can be combined to reproduce the target bi-directional color. The formula keys having a greater probability of generating a color match are evaluated prior to formula keys having a lesser probability of generating a color match. For each evaluation, the data extraction component 39 generates a degree of match between the formula key and the target bi-directional color. The data extraction component 39 then compares the degrees of match generated from all of the plurality of formula keys to determine the best match with the target bi-directional color. U.S. Pat. No. 5,720,017, entitled System And Method For Formulating A Color Match Using Color Keys, provides a more detailed discussion on using color keys to match a color standard. The data extraction component 39 can extract the formula keys from the color database 16 by using commercially available modules available from Microsoft, Oracle, etc, which directly extract the keys into the bi-directional color formulation tool 36, however, one of ordinary skill in the art will recognize that one can write specialized code to extract the keys into a common format and write additional specialized code to import the keys.

The bi-directional color formulation tool 36 also comprises a bi-directional color matching component 40 that determines the concentrations of the pigments, dyes and platelet-shaped pigments in the bi-directional color formula that was deemed to be the best match with target bi-directional color, so that the predicted visible spectra of the formula will match the measured spectra of the target bi-directional color. To find the concentrations of pigments, dyes and platelet-shaped pigments, the bi-directional color matching component 40 first retrieves the optical parameters for the pigments, dyes and platelet-shaped pigments used in the formula from the color database 16 and inputs them into the single particle scattering algorithm.

As mentioned above, the purpose of the single particle scattering algorithm is used to calculate the adsorption and scattering coefficient, and the scattering re-distribution function by wavelength for each pigment, dye and platelet-shaped pigment. The adsorption coefficient characterizes the probability of the particle adsorbing light of a particular wavelength. The scattering coefficient characterizes the probability of the particle scattering light of a particular wavelength. The scattering re-distribution function characterizes in what angles and proportions is the light scattered from incident light coming in from a given angle. The calculated adsorption and scattering coefficient and the scattering re-distribution function for each pigment, dye, and platelet-shaped pigment can be stored in the color database 16 in order to save future computational time. Once the single particle scattering algorithm calculates the adsorption and scattering coefficient, and the scattering re-distribution function by wavelength for each pigment, dye and platelet-shaped pigment, it will then use the concentrations of the pigments, dyes and platelet-shaped pigments in the bi-directional color formula to calculate an average adsorption and scattering coefficient, and the scattering re-distribution function by wavelength for the bi-directional color formula. The average adsorption and scattering coefficient is calculated based on the volume fraction concentration of each pigment, dye and platelet-shaped pigment present in the bi-directional color formula. The average scattering re-distribution function is calculated based on the combine mathematical weight of volume fraction concentration and scattering coefficient contribution of each pigment, dye and platelet-shaped pigment present in the bi-directional color formula.

The inputs to the single particle scattering algorithm for typical pigments and dyes include the complex refractive index by wavelength and the size distribution of any particle. Since typical pigments and dyes have particle sizes less than 10 microns, the single particle scattering algorithm uses Mie theory equations, which are well known and described in many publications and books including "The Scattering of Light and Other Electromagnetic Radiation" by Milton Kerker, Academic Press, 1969. Mie theory equations relate the complex refractive index, particle size, and the wavelength of light to the adsorption and scattering coefficient and the scattering re-distribution function. The algorithm will calculate the adsorption and scattering coefficient and the scattering re-distribution function for each particle size present in the inputted particle size distribution. The algorithm will then calculate an average adsorption and scattering coefficient based on the volume fraction of each particle size present in the particle size distribution. The algorithm will then calculate an average scattering re-distribution function based on the combine mathematical weight of volume fraction and scattering coefficient contribution for each particle size in the particle size distribution.

The inputs to the single particle scattering algorithm for platelet-shaped pigment include the complex refractive index by wavelength, shape and size distribution of the pigment, and the orientation distribution function of the pigment. Since platelet-shaped pigments are of particle sizes greater than 10 microns, the assumption of geometric optics is made. The single particle scattering algorithm uses a Monte Carlo approach of randomly firing rays from different angles of incidence at the pigment particle at a given orientation and using a standard geometric ray tracing technique that is based on Snell's law and Fresnels' equations to determine how much of the light ray is adsorbed and scattered and in which direction it is scattered. By firing 10,000 or more rays of light at particles at orientations that are randomly selected based on the frequency of occurrence in the orientation distribution function, the algorithm will calculate the adsorption and scattering coefficient and the scattering re-distribution function within a statistical confidence interval. Additionally, if the platelet-shaped pigments have a particle size distribution, the algorithm will randomly select the particle size based on the frequency of occurrence in the particle size distribution function.

For platelet-shaped pigment that are multi-layered or coated (e.g. $TiO_2$ coated Mica) which can generate interference and pearlescent effects, additional input information is required by the single particle scattering algorithm. The additional inputs for these multi-layer or coated platelet-shaped pigments include the number of different composition layers, their respective layer thickness, and complex refractive indexes of these layers by wavelength. For these multi-layer particles, the single particle scattering algorithm replaces Fresnels" equations that describe the reflection and transmission at an interface with more complicated equations for the reflection and transmission by a multi-layer thin film. These multi-layer thin film equations account for the constructive and destructive interference nature of light and their derivation can be found in a number of different sources including "Optical Electronics" by Ajoy Ghatak, K. Thyagarajan, Cambridge University Press, 1989.

The bi-directional color matching component 40 then takes the output from the single particle scattering algorithm for the bi-directional color formula and inputs it into the multiple scattering algorithm. As mentioned above, the multiple scattering algorithm uses an Adding and Doubling matrix method to handle the zenith angle dependence of multiple scattering and a Fourier series expansion technique to handle the azmuthal angle dependence of the light scattering. The adding and double method divides the material up into a series of infinitesimal thin planes in order to reach the condition of single scattering per plane. Once the condition of single scattering is achieved, the outputs from the single particle scattering algorithm for the bi-directional color formula, which include the adsorption and scattering coefficient, and the scattering re-distribution function by wavelength, is used to describe this single scattering plane.

The Adding or Doubling method uses a two dimensional reflection and transmission matrix for an infinitesimal thin plane to hold the proportion of light that is reflected and transmitted through the plane as described by the outputs from the single particle scattering algorithm for the bi-directional color formula. Through a series of matrix based multiplications and additions, the reflection and transmission matrices of a single layer can be doubled to produce the reflection and transmission matrices of a layer that is twice as thick as the primary layer. This doubling of the matrices is done until the desired thickness of the sample is generated. Then the air surface reflection and transmission matrices are added that represent the boundary between air and the material. The surface reflection and transmission matrices are obtained using Fresnel's equations, although the addition of rough surface equations could be easily applied. Each of the reflection and transmission matrices has dimensions that are dependent upon the number of discrete polar angles. Typically, sixteen different polar angles is selected for calculations, however more or less could be used in a trade off between computational speed and predictive accuracy. A general Fourier series expansion technique is used decouple the azmuthal angle dependence in the light scattering matrix equations. A number of different publications describe the details of the Adding and Doubling method and the Fourier series expansion technique including the reference "Matrix Operator Theory of Radiative Transfer. 1: Rayleigh Scattering" by G Plass, G. Kattawar, F. Catchings, Applied Optics, Vol 12, No 2, 1973. One of ordinary skill in the art will recognize that there are other mathematical methods to handle the multiple light scattering which fall under the general heading of radiative transfer and multi-flux theories. The Adding and Doubling method is used because of its speed and ease of implementation for multi-layer materials. Multi-layer materials are composed of different layers in a material with each layer having a different color formula composed of pigments, dyes and platelet-shaped pigments. In this disclosure, the Adding and Doubling method is used to predict the bi-directional color in multi-layer materials.

The bi-directional color matching component 40 then utilizes a non-linear least squares fitting method to determine the concentrations of the pigments, dyes, platelet-shaped pigments that will generate a predicted visible spectra that matches the measured spectra of the target bi-directional color. The Levenberg-Marquardt Method for least squares fitting non-linear models as described by Marquardt, D. W. 1963, Journal of the Society for Industrial and Applied Mathematics, vol. 11 pp 431–441 is used to calculate the concentrations of the pigments. The Levenberg-Marquardt Method is a generic least squares fitting method and can be used for any non-linear function F (e.g. Y=F(X)). Through an iterative approach, it will find the best X parameters that generate the Y response that has the lowest squares error with respect to the Y target value. For this implementation the spectral measurements and their respective tristimulus values for the targeted bi-directional color and the desired total concentration of colorants are the Y target values. The concentration of the pigments, dyes, and platelet-shaped pigments to be used in the bi-directional color formula are the X parameters to be found through the least squares fitting method. The single particle scattering algorithm and the multiple scattering algorithm is the non-linear function that relates the concentrations, or X parameters, to the predicted Y response values including predicted spectral measurements, tristimulus values, and total colorant concentration.

Referring again to FIG. 3, the bi-directional color formulation tool 36 also comprises a color modifying component 42 that modifies the color formula to the target bi-directional color if the formula of the best match is unacceptable. The color modifying component 42 modifies the color formula by performing one of three functions. One function is permitting the user of the bi-directional color formulation tool 36 to manually adjust the concentration of the pigments, dyes, and platelet-shaped pigments in the color formula to produce a better match with the target bi-directional color. The user does this by entering changes through the keyboard 26 and mouse 28. Once the user changes the concentrations of the pigments, dyes and platelet-shaped pigments, the color modifying component 42 will show how well the modified formula matches the spectral curve of the target bi-directional color. Additionally, the user can use the least squares fitting procedure to change the concentrations of the pigments, dyes and platelet-shaped pigments to try to improve the match with the spectral curve of the target bi-directional color. Another function that the color modifying component 42 may perform is synthesizing or building a better match with the target bi-directional color. The user may synthesize a match with any of the pigments, dyes and platelet-shaped pigments in the color database 16. Generally, the user will employ the synthesize function if the original match was not satisfactory. In order to build a match with the synthesizing function, the color modifying component 42 selects combinations of pigments, dyes and platelet-shaped pigments that are most likely to provide a match, based on a statistical analysis of previous matches and initiates a search of the color database 16 to find the best match. The color modifying component 42 stops the search when the matching requirements have been satisfied. Also, the user can stop the search when satisfied with the results or when a set number of trials have been evaluated. The third function is for the color modifying component 42 to search again through the previously used bi-directional color formulations stored in the color database 16 until it finds a more acceptable match. U.S. Pat. No. 5,608,633 entitled "Method And System For Formulating A Color Match" provides a more detailed discussion on manually adjusting colorants to obtain a match, synthesizing a match or searching the color database to find another match.

Figure 4:
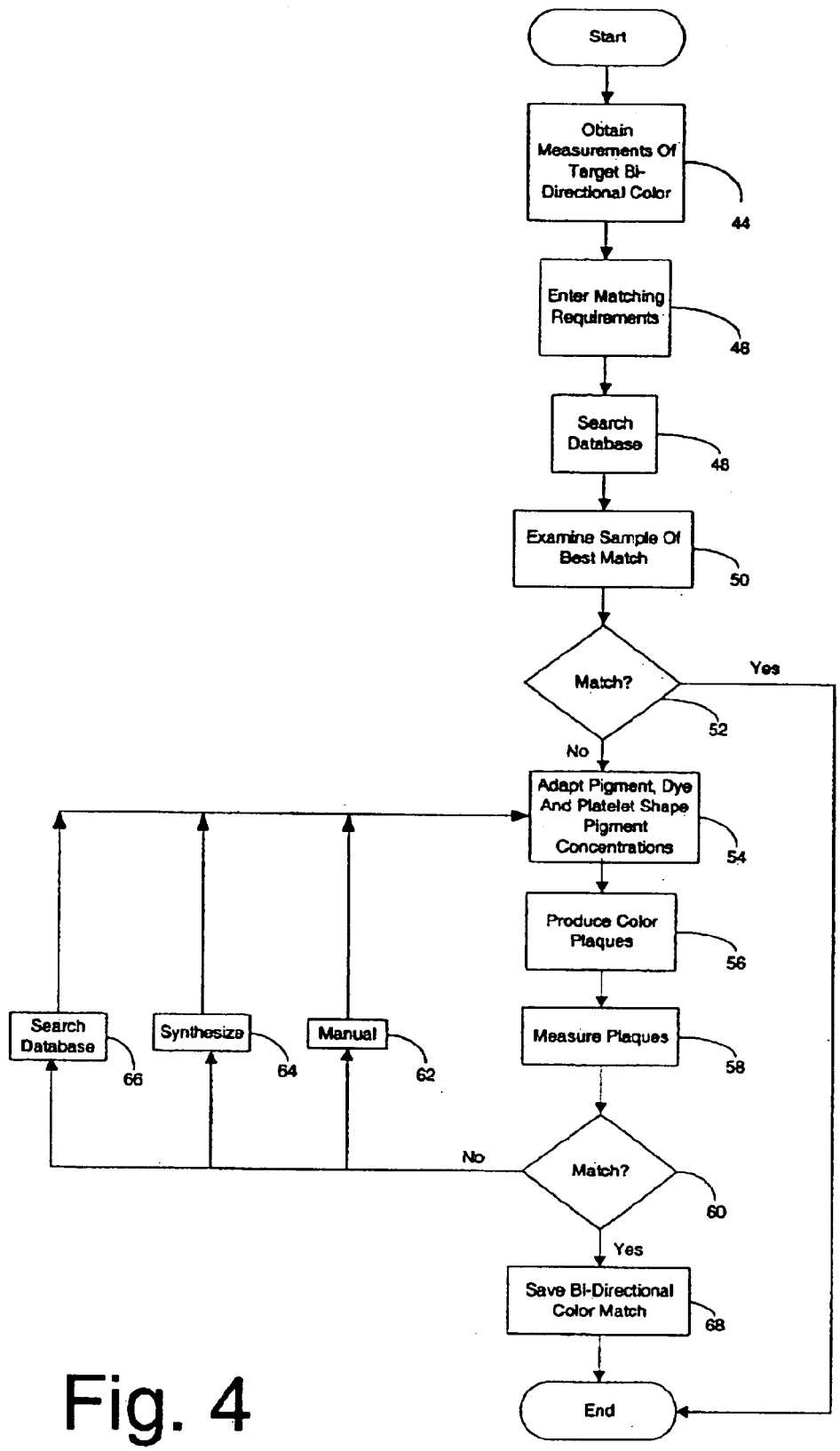
FIG. 4 shows a flow chart describing the operations performed by the system shown in FIG. 1.

FIG. 4 shows a flow chart describing the operations performed by the system shown in FIG. 1. At 44, the computing unit 18 obtains the spectral measurements of the target bi-directional color from the spectrophotometers 12 and 14. Next, the user enters matching requirement information into the computing unit 18 using the keyboard 26 and mouse 28 at 46. The matching requirement information is the requirements that the user wants the matching bi-directional color formula to have so that it can best match the target bi-directional color. The matching requirement information may include items such as what pigments, dyes and platelet-shaped pigments can be used to obtain the bi-directional color match and what their respective maximum concentrations can be. For sparkle and metallic colors, the user can use an optical microscope to determine what would be the best particle sizes for the platelet-shaped pigments to use in color matching the target bi-directional color. This information would be inputted into the bi-directional color match tool by selecting only those platelet-shaped pigments that have the desired particle sizes to match the target bi-directional color. Additional information that the user may enter includes match weighting factors which specify the relative importance of the attributes of the desired match. The bi-directional color formulation tool 36 places more emphasis on the requirements that have the higher number weight. Attributes that are weighted may include the total cost, adjustability, weatherability, thermal stability, and opacity of the formula, and particular angles of observation and illumination that matches the target bi-directional color.

Next, the bi-directional color formulation tool 36 searches the color database at 48 for a set of formulations that will most likely match the target bi-directional color. The bi-directional color formulation tool 36 searches the database according to the multiple measurements taken by the spectrophotometers 12 and 14 and the matching requirements entered by the user. The bi-directional color formulation tool 36 extracts formula keys that have a greater probability of generating a match with the target bi-directional color. The bi-directional color formulation tool 36 then evaluates each of the formula keys in order of their probability of generating a color match with the target bi-directional color to determine whether the pigments, dyes, platelet-shaped pigments in each formula key can be combined to reproduce the target bi-directional color. The formula key having the best match to the target bi-directional color is then presented to the user. The user then pulls a physical sample of the best match at 50 and inspects the sample at 52 to determine if the color of the sample does indeed provide an acceptable match with the target bi-directional color. This disclosure is not limited to examining a physical sample and one of ordinary skill in the art will recognize that one can achieve this step by viewing the color of the best match on the display 30 of the computing unit 18.

If the match is acceptable, then the process is over. Sometimes the match is not satisfactory and therefore the concentrations of the pigments, dyes and platelet-shaped pigments in the formula have to be adapted. Any changes to the concentrations of the pigments, dyes and platelet-shaped pigments occur at 54. The bi-directional color matching component 40 makes the changes to the concentrations of the pigments, dyes and platelet-shaped pigments in the aforementioned manner. Next, samples of color plaques are made at 56 using the modified formula of pigments, dyes and platelet-shaped pigments. The spectrophotometers 12 and 14 then measure the color plaques at 58 under a multiple of viewing angles. The user then decides at 60 whether the spectral measurements and visual appearance of the plaques are a good enough match with the target bi-directional color. If the new match is acceptable then the formula of pigments, dyes and platelet-shaped pigments and their modified concentrations are saved into the database at 68 and the bi-directional color matching process is over.

However, if the match is not acceptable, then there are three options available. One option is to manually or automatically adjust the concentrations of the pigments, dyes and platelet-shaped pigments at 62. Another option available to the user is to synthesize or build a match from scratch using any of the pigments, dyes and platelet-shaped pigments stored in the color database at 64. The third option available to the user is to search the color database again at 66 to find a different match and then repeat any modifications to the concentrations of the pigments, dyes and platelet-shaped pigments. After one of the three options is performed the processing of blocks 54–58 continues until a match is found at 60. When a match is approved, the bi-directional color formula for that match is stored in the color database at 68 so that it can be used as a previous case for a future match. This allows the bi-directional color formulation system to learn new matches and grow as time goes by.

The foregoing flow diagram of FIG. 4 shows the functionality and operation of the system. In this regard, some of the blocks that pertain to the bi-directional color formulation tool represent a module, segment, or portion of code, which comprises one or more executable instructions for implementing the specified logical function(s). It should also be noted that in some alternative implementations, the functions noted in the blocks may occur out of the order noted in the figure or, for example, may in fact be executed substantially concurrently or in the reverse order, depending upon the functionality involved. Furthermore, the functions can be implemented in programming languages such as Java, however, other languages such as C/C++, Fortran, Basic, and Pascal can be used.

Figure 5:
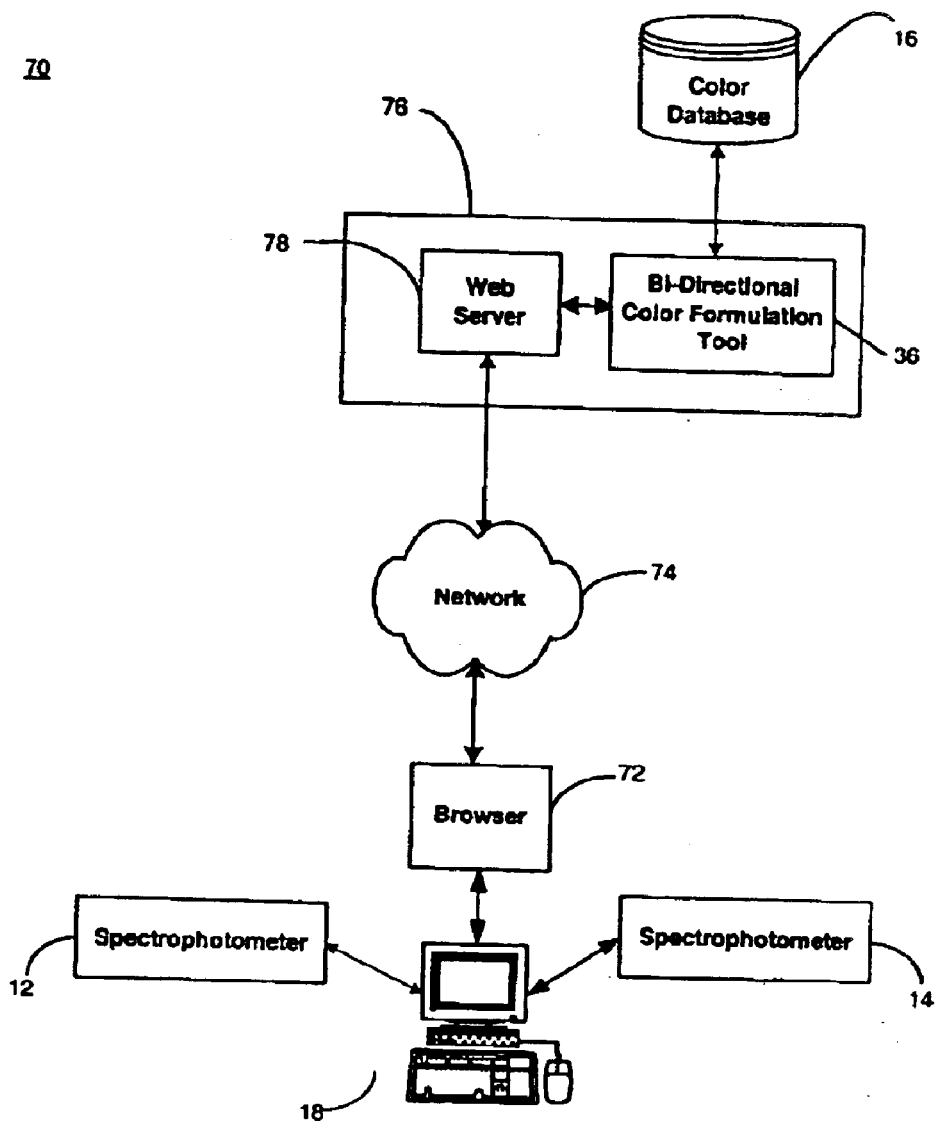
FIG. 5 shows an architectural diagram of a system for implementing the system shown in FIG. 1 and the bi-directional color formulation tool shown in FIG. 3 on a network.

FIG. 5 shows an architectural diagram of a system 70 for implementing the system shown in FIG. 1 and the bi-directional color formulation tool 36 shown in FIG. 3 on a network. In FIG. 5, the computing unit 18 allows a user to access the bi-directional color formulation tool 36 over a network such as the Internet. The computing unit 18 can take the form of a hand-held digital computer, personal digital assistant computer, notebook computer, personal computer or workstation. In this embodiment, the user obtains the spectral measurements of the target bi-directional color through the spectrophotometers 12 and 14. The user uses a web browser 72 such as Microsoft INTERNET EXPLORER, Netscape NAVIGATOR or Mosaic to locate and display the bi-directional color formulation tool 36 on the computing unit 18. A communication network 74 such as an electronic or wireless network connects the computing unit 18 to the bi-directional color formulation tool 36. In particular, the computing unit 18 may connect to the bi-directional color formulation tool 36 through a private network such as an extranet or intranet or a global network such as a WAN (e.g., Internet). As shown in FIG. 5, the bi-directional color formulation tool 36 resides in a server 76, which comprises a web server 78 that serves the bi-directional color formulation tool 36 and the color database 16 that contains the color data. However, the bi-directional color formulation tool 36 does not have to be co-resident with the server 76.

If desired, the system 70 may have functionality that enables authentication and access control of users accessing the bi-directional color formulation tool 36. Both authentication and access control can be handled at the web server level by the bi-directional color formulation tool 36 itself, or by commercially available packages such as Netegrity SITEMINDER. Information to enable authentication and access control such as the user's name, location, telephone number, organization, login identification, password, access privileges to certain resources, physical devices in the network, services available to physical devices, etc. can be retained in a database directory. The database directory can take the form of a lightweight directory access protocol (LDAP) database; however, other directory type databases with other types of schema may be used including relational databases, object-oriented databases, flat files, or other data management systems.

In this implementation, the bi-directional color formulation tool 36 may run on the web server 78 in the form of servlets, which are applets (e.g., Java applets) that run a server. Alternatively, the bi-directional color formulation tool 36 may run on the web server 76 in the form of CGI (Common Gateway Interface) programs. The servlets access the color database 16 using JDBC or Java database connectivity, which is a Java application programming interface that enables Java programs to execute SQL (structured query language) statements. Alternatively, the servlets may access the color database 16 using ODBC or open database connectivity. Using hypertext transfer protocol or HTTP, the web browser 72 obtains a variety of applets that execute the bi-directional color formulation tool 36 on the computing unit 18 allowing the user to perform the processing steps detailed in FIG. 4.

The above-described systems and tool comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

It is apparent that there has been provided in accordance with this invention, a method, system and computer product for formulating a bi-directional color match. While the invention has been particularly shown and described in conjunction with a preferred embodiment thereof, it will be appreciated that variations and modifications can be effected by a person of ordinary skill in the art without departing from the scope of the invention.

What is claimed is:

1. A method for formulating a bi-directional color match, comprising:
    obtaining a plurality of spectral measurements of a target bi-directional color; and
    determining a combination of pigments, dyes and platelet-shaped pigments having a plurality of predicted spectral measurements that match the plurality spectral measurements of the target bi-directional color, wherein the determining comprises obtaining a plurality of optical parameters for each of the pigments, dyes and platelet-shaped pigments and applying the plurality of optical parameters to a single particle scattering algorithm.

2. The method according to claim 1, wherein the single particle scattering algorithm uses Mie scattering and a Monte Carlo method based on geometric optics ray-tracing.

3. The method according to claim 1, further comprising applying output from the single particle scattering algorithm to a multiple scattering algorithm.

4. The method according to claim 3, wherein the multiple scattering algorithm uses an Adding and Doubling matrix method and a Fourier series expansion technique.

5. The method according to claim 3, further comprising applying output from the multiple scattering algorithm to a non-linear squares fitting method to determine a formula comprising a combination of pigments, dyes and platelet-shaped pigments and concentrations thereof that match the target bi-directional color.

6. A method for formulating a bi-directional color match from a set of previously used bi-directional color formulations, comprising:
    obtaining a plurality of spectral measurements of a target bi-directional color;
    searching the set of previously used bi-directional color formulations for color formulas that approximates the target bi-directional color;
    determining from the color formulas a formula that best matches the target bi-directional color;
    applying optical parameters associated with the pigments, dyes and platelet-shaped pigments in the color formula having the best match to a single particle scattering algorithm;
    determining the concentrations of the pigments, dyes and platelet-shaped pigments in the color formula in accordance with the single particle scattering algorithm, wherein the determined concentrations generate a predicted visible spectra that matches the spectral measurements associated with the target bi-directional color; and
    adapting the concentrations of the pigments, dyes and platelet-shaped pigments in the color formula if necessary.

7. The method according to claim 6, further comprising examining color plaques made from the adapted color formula and determining the acceptability of the formula.

8. The method according to claim 6, further comprising modifying the adapted color formula if the formula is unacceptable, the modifying comprising at least one of manual adjusting the concentrations of the pigments, dyes and platelet-shaped pigments in the formula, synthesizing a match with the target bi-directional color, or searching through the set of previously used bi-directional color formulations to find an acceptable match.

9. The method according to claim 6, further comprising receiving matching requirements for obtaining the set of color formulas that approximates the target bi-directional color, wherein the matching requirements comprise a plurality of optical parameters.

10. The method according to claim 6, further comprising storing the color formula having the acceptable match with the set of previously used bi-directional color formulations.

11. The method according to claim 6, wherein the single particle scattering algorithm uses Mie scattering and a Monte Carlo method based on geometric optics ray-tracing.

12. The method according to claim 6, further comprising applying output from the single particle scattering algorithm to a multiple scattering algorithm.

13. The method according to claim 12, wherein the multiple scattering algorithm uses an Adding and Doubling matrix method and a Fourier series expansion technique.

14. The method according to claim 12, further comprising applying output from the multiple scattering algorithm to a non-linear squares fitting method.

15. A method for formulating a bi-directional color match from a set of previously used bi-directional color formulations, comprising:
- obtaining a plurality of spectral measurements of a target bi-directional color;
- receiving matching requirements for obtaining color formulas that approximates the target bi-directional color;
- searching the set of previously used bi-directional color formulations according to the matching requirements;
- determining from the set of color formulas a color formula that best matches the target bi-directional color according to the matching requirements;
- applying optical parameters associated with the pigments, dyes and platelet-shaped pigments in the color formula having the best match to a single particle scattering algorithm;
- determining the concentrations of the pigments, dyes and platelet-shaped pigments in the color formula in accordance with the single particle scattering algorithm, wherein the determined concentrations generate a predicted visible spectra that matches the spectral measurements associated with the target bi-directional color;
- adapting the concentrations of the pigments, dyes and platelet-shaped pigments in the color formula; and
- determining if the adapted color formula matches the target bi-directional color.

16. The method according to claim 15, further comprising examining color plaques made from the adapted color formula and determining the acceptability of the formula.

17. The method according to claim 15, further comprising modifying the adapted color formula if the formula is unacceptable, the modifying comprising at least one of manual adjusting the concentrations of the pigments, dyes and platelet-shaped pigments in the color formula, synthesizing a match with the target bi-directional color, or searching through the set of previously used bi-directional color formulations until there is an acceptable match.

18. The method according to claim 15, further comprising storing the color formula having the acceptable match with the set of previously used bi-directional color formulations.

19. The method according to claim 15, wherein the single particle scattering algorithm uses Mie scattering and a Monte Carlo method based on geometric optics ray-tracing.

20. The method according to claim 15, further comprising applying output from the single particle scattering algorithm to a multiple scattering algorithm.

21. The method according to claim 20, wherein the multiple scattering algorithm uses an Adding and Doubling matrix method and a Fourier series expansion technique.

22. The method according to claim 20, further comprising applying output from the multiple scattering algorithm to a non-linear squares fitting method.

23. A method for formulating a bi-directional color match from a set of previously used bi-directional color formulations, comprising:
- obtaining a plurality of spectral measurements of a target bi-directional color;
- receiving matching requirements for obtaining color formulas that approximates the target bi-directional color;
- searching the set of previously used bi-directional color formulations according to the matching requirements;
- determining from the set of color formulas a color formula that best matches the target bi-directional color according to the matching requirements;
- applying optical parameters associated with the pigments, dyes and platelet-shaped pigments in the color formula having the best match to a single particle scattering algorithm;
- determining the concentrations of the pigments, dyes and platelet-shaped pigments in the color formula in accordance with the single particle scattering algorithm, wherein the determined concentrations generate a predicted visible spectra that matches the spectral measurements associated with the target bi-directional color;
- adapting the concentrations of the pigments, dyes and platelet-shaped pigments in the color formula to improve the match with the target bi-directional color if the formula is unacceptable;
- determining if the adapted color formula matches the target bi-directional color; and
- modifying the adapted color formula if the formula is unacceptable, the modifying comprising at least one of manual adjusting the concentrations of the pigments, dyes and platelet-shaped pigments in the color formula, synthesizing a match with the target bi-directional color, or searching through the set of previously used bi-directional color formulations until there is an acceptable match.

24. The method according to claim 23, wherein the single particle scattering algorithm uses Mie scattering and a Monte Carlo method based on geometric optics ray-tracing.

25. The method according to claim 23, further comprising applying output from the single particle scattering algorithm to a multiple scattering algorithm.

26. The method according to claim 25, wherein the multiple scattering algorithm uses an Adding and Doubling matrix method and a Fourier series expansion technique.

27. The method according to claim 25, further comprising applying output from the multiple scattering algorithm to a non-linear squares fitting method.

28. A system for formulating a bi-directional color match, comprising:
- a spectrophotometer that obtains a plurality of spectral measurements of a target bi-directional color;
- a color database containing a plurality of optical parameters associated with pigments, dyes and platelet-shaped pigments used in previously used bi-directional color formulations; and
- a computing unit that determines a combination of pigments, dyes and metal flake pigments having a plurality of predicted spectral measurements that match the plurality of spectral measurements of the target bi-directional color, wherein the computing unit obtains the plurality of optical parameters from the color database for each of the pigments, dyes and platelet-shaped pigments in the combination that matches the target bi-directional color and applies the plurality optical parameters to a single particle scattering algorithm.

29. The system according to claim 28, wherein the single particle scattering algorithm uses Mie scattering and a Monte Carlo method based on geometric optics ray-tracing.

30. The system according to claim 28, wherein the computing unit applies output from the single particle scattering algorithm to a multiple scattering algorithm.

31. The system according to claim 30, wherein the multiple scattering algorithm uses an Adding and Doubling matrix method and a Fourier series expansion technique.

32. The system according to claim 30, wherein the computing unit applies output from the multiple scattering algorithm to a non-linear squares fitting method to determine a formula comprising a combination of pigments, dyes and platelet-shaped pigments and concentrations thereof that match the target bi-directional color.

33. A system for formulating a bi-directional color match from a set of previously used bi-directional color formulations, comprising:
   a spectrophotometer that obtains a plurality of spectral measurements of a target bi-directional color;
   a color database containing a plurality of previously used bi-directional color formulations and a plurality of optical parameters associated with each of the pigments, dyes and platelet-shaped pigments used in the bi-directional color formulations; and
   a computing unit, coupled to the spectrophotometer and color database, that searches the color database for a set of color formulas that approximates the target bi-directional color and determines from the set of color formulas a color formula that best matches the target bi-directional color measured by the spectrophotometer, wherein the computing unit obtains the plurality of optical parameters from the color database for each of the pigments, dyes and platelet-shaped pigments in the combination that matches the target bi-directional color and applies the plurality optical parameters to a single particle scattering algorithm and applies output from the single particle scattering algorithm to a multiple scattering algorithm.

34. The system according to claim 33, wherein the computing unit adapts the concentrations of the pigments, dyes and platelet-shaped pigments in the color formula.

35. The system according to claim 34, wherein the computing unit determines if the adapted color formula matches the target bi-directional color.

36. The system according to claim 35, wherein the computing unit modifies the adapted color formula if the formula is unacceptable, the modifying including at least one of manual adjusting the concentrations of the pigments, dyes and platelet-shaped pigments in the formula, synthesizing a match with the target bi-directional color, or searching through the color database of previously used bi-directional color formulations until there is an acceptable match.

37. The system according to claim 36, wherein the computing unit stores the color formula having the acceptable match in the color database.

38. The system according to claim 33, wherein the single particle scattering algorithm uses Mie scattering and a Monte Carlo method based on geometric optics ray-tracing.

39. The system according to claim 33, wherein the multiple scattering algorithm uses an Adding and Doubling matrix method and a Fourier series expansion technique.

40. The system according to claim 33, wherein the computing unit applies output from the multiple scattering algorithm to a non-linear squares fitting method.

41. A bi-directional color formulation tool, comprising:
   a data acquisition component that obtains a plurality of spectral measurement of a target bi-directional color from a spectrophotometer;
   a data extraction component that extracts a set of previously used color formulations that approximates the target bi-directional color data from a color database and determines a formula from the set that best matches the target bi-directional color; and
   a bi-directional color matching component that determines the concentrations of the pigments, dyes and platelet-shaped pigments in the formula to generate a predicted visible spectra that matches the target bi-directional color spectra, wherein the bi-directional color matching component determines from the set of color formulas a formula that best matches the target bi-directional color and applies a plurality of optical parameters associated with the pigments, dyes and platelet-shaped pigments in the color formula having the best match to a single particle scattering algorithm.

42. The tool according to claim 41, further comprising a color modifying component that modifies the formula if it is unacceptable, the color modifying component performing at least one of manual adjusting the concentrations of the pigments, dyes and platelet-shaped pigments in the color formula, synthesizing a match with the target bi-directional color, or searching through the set of previously used bi-directional color formulations until there is an acceptable match.

43. The tool according to claim 41, wherein the single particle scattering algorithm uses Mie scattering and a Monte Carlo method based on geometric optics ray-tracing.

44. The tool according to claim 41, wherein the bi-directional color matching component applies output from the single particle scattering algorithm to a multiple scattering algorithm.

45. The tool according to claim 44, wherein the multiple scattering algorithm uses an Adding and Doubling matrix method and a Fourier series expansion technique.

46. The tool according to claim 44, wherein the bi-directional color matching component applies output from the multiple scattering algorithm to a non-linear squares fitting method.

47. A computer-readable medium storing computer instructions for instructing a computer system to formulate a bi-directional color match, the computer instructions comprising:
   obtaining a plurality of spectral measurements of a target bi-directional color; and
   determining a combination of pigments, dyes and platelet-shaped pigments having a plurality of predicted spectral measurements that match the plurality of spectral measurements of the target bi-directional color, wherein the determining comprises instructions for obtaining a plurality of optical parameters for each of the pigments, dyes and platelet-shaped pigments and applying the plurality of optical parameters to a single particle scattering algorithm.

48. The computer-readable medium according to claim 47, wherein the single particle scattering algorithm uses Mie scattering and a Monte Carlo method based on geometric optics ray-tracing.

49. The computer-readable medium according to claim 47, further comprising instructions for applying output from the single particle scattering algorithm to a multiple scattering algorithm.

50. The computer-readable medium according to claim 49, wherein the scattering algorithm uses an Adding and Doubling matrix method and a Fourier series expansion technique.

51. The computer-readable medium according to claim 49, further comprising instructions for applying output from the multiple scattering algorithm to a non-linear squares fitting method to determine a formula comprising a combination of pigments, dyes and platelet-shaped pigments and concentrations thereof that match the target bi-directional color.

52. A computer-readable medium storing computer instructions for instructing a computer system to formulate a bi-directional color match from a set of previously used bi-directional color formulations, the computer instructions comprising:

obtaining a plurality of spectral measurements of a target bi-directional color;

searching the set of previously used bi-directional color formulations for color formulas that approximates the target bi-directional color;

determining from the color formulas a formula that best matches the target bi-directional color;

applying optical parameters associated with the pigments, dyes and platelet-shaped pigments in the color formula having the best match to a single particle scattering algorithm;

determining the concentrations of the pigments, dyes and platelet-shaped pigments in the color formula in accordance with the single particle scattering algorithm, wherein the determined concentrations generate a predicted visible spectra that matches the spectral measurements associated with the target bi-directional color; and adapting the concentrations of the pigments, dyes and platelet-shaped pigments in the color formula if desired.

53. The computer-readable medium according to claim 52, further comprising instructions for modifying the adapted color formula if the formula is unacceptable, the modifying comprising at least one of manual adjusting the concentrations of the pigments, dyes and platelet-shaped pigments in the formula, synthesizing a match with the target bi-directional color, or searching through the set of previously used bi-directional color formulations to find an acceptable match.

54. The computer-readable medium according to claim 52, further comprising instructions for receiving matching requirements for obtaining the set of color formulas that approximates the target bi-directional color.

55. The computer-readable medium according to claim 52, further comprising instructions for storing the color formula having the acceptable match with the set of previously used bi-directional color formulations.

56. The computer-readable medium according to claim 52, wherein the single particle scattering algorithm uses Mie scattering and a Monte Carlo method based on geometric optics ray-tracing.

57. The computer-readable medium according to claim 52, further comprising instructions for applying output from the single particle scattering algorithm to a multiple scattering algorithm.

58. The computer-readable medium according to claim 57, wherein the multiple scattering algorithm uses an Adding and Doubling matrix method and a Fourier series expansion technique.

59. The computer-readable medium according to claim 57, wherein comprising instructions for applying output from the multiple scattering algorithm to a non-linear squares fitting method.

60. A computer-readable medium storing computer instructions for instructing a computer system to formulate a bi-directional color match from a set of previously used bi-directional color formulations, the computer instructions comprising:

obtaining a plurality of spectral measurements of a target bi-directional color;

receiving matching requirements for obtaining color formulas that approximates the target bi-directional color;

searching the set of previously used bi-directional color formulations according to the matching requirements;

determining from the set of color formulas a color formula that best matches the target bi-directional color according to the matching requirements;

applying optical parameters associated with the pigments, dyes and platelet-shaped pigments in the color formula having the best match to a single particle scattering algorithm;

determining the concentrations of the pigments, dyes and platelet-shaped pigments in the color formula in accordance with the single particle scattering algorithm, wherein the determined concentrations generate a predicted visible spectra that matches the spectral measurements associated with the target bi-directional color;

adapting the concentrations of the pigments, dyes and platelet-shaped pigments in the color formula; and determining if the adapted color formula matches the target bi-directional color.

61. The computer-readable medium according to claim 60, further comprising instructions for modifying the adapted color formula if the formula is unacceptable, the modifying comprising at least one of manual adjusting the concentrations of the pigments, dyes and platelet-shaped pigments in the color formula, synthesizing a match with the target bi-directional color, or searching through the set of previously used bi-directional color formulations until there is an acceptable match.

62. The computer-readable medium according to claim 60, further comprising instructions for storing the color formula having the acceptable match with the set of previously used bi-directional color formulations.

63. The computer-readable medium according to claim 60, wherein the single particle scattering algorithm uses Mie scattering and a Monte Carlo method based on geometric optics ray-tracing.

64. The computer-readable medium according to claim 60, further comprising instructions for applying output from the single particle scattering algorithm to a multiple scattering algorithm.

65. The computer-readable medium according to claim 64, wherein the multiple scattering algorithm uses an Adding and Doubling matrix method and a Fourier series expansion technique.

66. The computer-readable medium according to claim 64, further comprising instructions for applying output from the multiple scattering algorithm to a non-linear squares fitting method.

67. A computer-readable medium storing computer instructions for instructing a computer system to formulate a bi-directional color match from a set of previously used bi-directional color formulations, the computer instructions comprising:

obtaining a plurality of spectral measurements of a target bi-directional color;

receiving matching requirements for obtaining color formulas that approximates the target bi-directional color;

searching the set of previously used bi-directional color formulations according to the matching requirements;

determining from the set of color formulas a color formula that best matches the target bi-directional color according to the matching requirements;

applying optical parameters associated with the pigments, dyes and platelet-shaped pigments in the color formula having the best match to a single particle scattering algorithm;

determining the concentrations of the pigments, dyes and platelet-shaped pigments the color formula in accordance with the single particle scattering algorithm, wherein the determined concentrations generate a predicted visible spectra that matches the spectral measurements associated with the target bi-directional color;

adapting the concentrations of the pigments, dyes and platelet-shaped pigments in the color formula to improve the match with the target bi-directional color if the formula is unacceptable;

determining if the adapted color formula matches the target bi-directional color; and modifying the adapted color formula if the formula is unacceptable, the modifying comprising at least one of manual adjusting the concentrations of the pigments, dyes and platelet-shaped pigments in the color formula, synthesizing a match with the target bi-directional color, or searching through the set of previously used bi-directional color formulations until there is an acceptable match.

68. The computer-readable medium according to claim 67, wherein the single particle scattering algorithm uses Mie scattering and a Monte Carlo method based on geometric optics ray-tracing.

69. The computer-readable medium according to claim 67, further comprising instructions for applying output from the single particle scattering algorithm to a multiple scattering algorithm.

70. The computer-readable medium according to claim 69, wherein the multiple scattering algorithm uses an Adding and Doubling matrix method and a Fourier series expansion technique.

71. The computer-readable medium according to claim 69, further comprising instructions for applying output from the multiple scattering algorithm to a non-linear squares fitting method.

* * * * *